Figure 1:
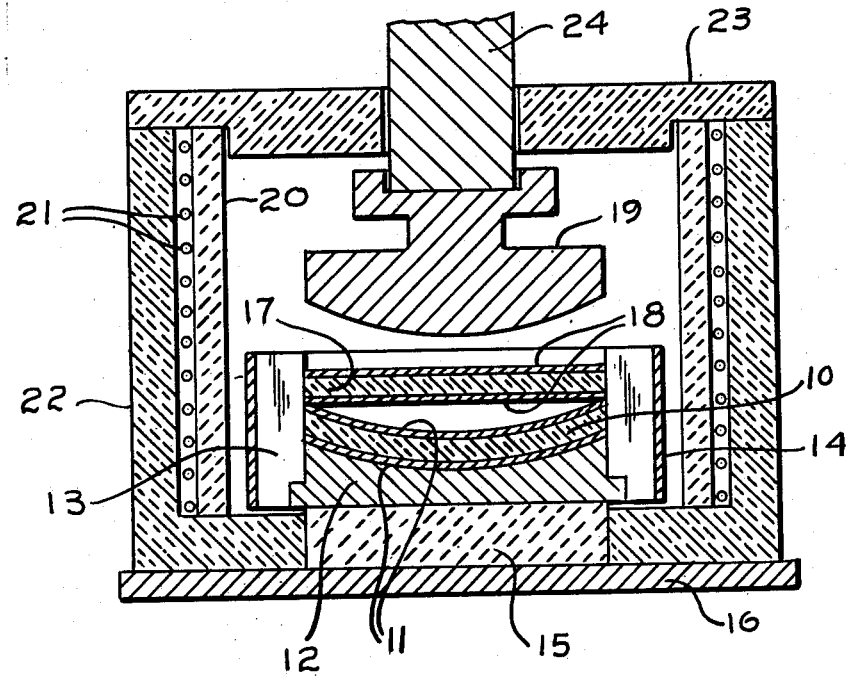

June 11, 1957  J. T. LITTLETON  2,795,084
METHOD OF SHAPING A GLASS ARTICLE
Filed July 20, 1955

INVENTOR.
JESSE T. LITTLETON
BY Clarence R. Patty, Jr.
ATTORNEY

United States Patent Office 2,795,084
Patented June 11, 1957

2,795,084
METHOD OF SHAPING A GLASS ARTICLE

Jesse T. Littleton, Corning, N. Y., assignor to Corning Glass Works, Corning, N. Y., a corporation of New York Application July 20, 1955, Serial No. 523,276

13 Claims. (Cl. 49—84)

This invention relates to improvements in the art of reshaping the surface of a glass body to conform with the contour of a surface of a mold or of a second glass body by contacting said surfaces with or without the application of external pressure while heated.

In the past it has been found advantageous to conform the surfaces of two glass bodies at a relatively low temperature, that is, a temperature within the annealing range of the softer glass, thereby obtaining precisely matched surface contours without laborious grinding and polishing operations. By thus conforming such surfaces, accurately fitted composite units such as an optical element, a laminated sheet, or the like can be produced.

One technique has involved bringing together two glass surfaces, one of which it was desired to fit or cause to conform to the other, and then applying pressure to urge the surfaces into agreement in the presence of sufficient heat to release the stress set up by the pressure but without softening the surfaces. When this treatment is continued for a predetermined length of time, the surfaces will be found to be in essential contact and will remain so if the pressure is removed. By such a procedure it is possible to reduce the number of interference fringes between two glass surfaces from an intial value of 100 or more to less than 5.

In the conventional bending of sheet glass, one or more sheets are placed on a more refractory base or mold having a desired contour and the base and the sheet or sheets are heated until the glass, without substantial change of thickness or other distortion, has conformed to the contour of the base.

Under the conditions of such methods there is an objectionable tendency for the contacting surfaces to adhere and become welded together, particularly if the temperature is in the highest part of the annealing range and more particularly also if the annealing ranges of the glasses are similar and/or the pressure is unduly long maintained. While the adhesion of the contacting surfaces may be prevented by inserting between them a sufficiently refractory material, slight irregularities in the surface of the interposed material are impressed into the surface of the glass causing a loss of accuracy and objectionably decreasing the efficacy of the process.

It is an object of the present invention to provide an improved method of thus conforming glass surfaces, whereby the above-described difficulties and disadvantages can be overcome and the contacting surfaces can be accurately matched without adhesion even at temperatures practically as high as the softening point of the softer glass, in which case an increased speed of conformation of the surfaces may be attained, particularly if the required amount of conformation be relatively slight. (Softening point is the temperature at which the viscosity of the glass is $10^{7.6}$ poises.)

In accordance with the invention the method in its broader aspect comprises conforming a surface of a glass body with the contour of a surface of another body, such as a metal mold or another glass body, by forming on the contacting glass surface or surfaces an adherent metal oxide film, placing the bodies together and shaping the glass surface or surfaces while the bodies are heated sufficiently to permit plastic flow and conformation of the glass.

For conforming a plurality of glass bodies under the application of external pressure, the method comprises forming on the contacting surfaces of the glass bodies a substantially transparent iridized metal oxide film, placing said surfaces together and applying pressure to urge said surfaces into intimate contact while heating said bodies between the strain point and the softening point of the softer glass until said surfaces are conformed to each other and the stresses induced by such pressure have been released, then cooling said bodies and removing the pressure. (Strain point is the temperature at which the viscosity of the glass is $10^{14.5}$ poises.)

Figure 2:
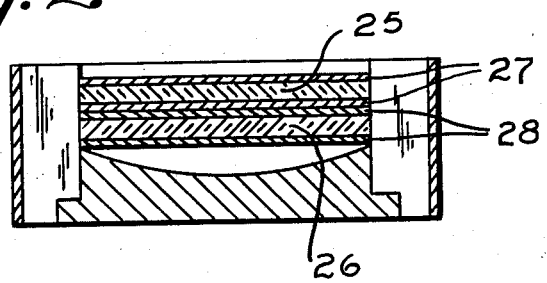

Apparatus for carrying out a preferred method in accordance with the invention is illustrated in the accompanying drawing in which:

Fig. 1 is a sectional elevation showing two glass bodies provided with adherent metal oxide films and disposed in a mold, one of which bodies is to be conformed to the shape of the other body in accordance with my invention, and Fig. 2 is a sectional elevation of a mold similar to that shown in Fig. 1 and containing two flat glass bodies provided with adherent metal oxide films, both of which bodies are to be conformed to the shape of the mold and to each other in accordance with the invention.

In Fig. 1 a glass body 10, having a desired surface contour and provided with adherent metal oxide films, 11 shown in exaggerated thickness. is disposed in a metal mold comprising a mold bottom 12, a split ring 13, and a clamping band 14, the bottom 12, being supported on a refractory pedestal 15, and a press bed 16. A second glass body 17, having plane surfaces provided with adherent metal oxide films 18, also shown in exaggerated thickness, is disposed in said mold above the glass body 10. Above the glass body 17, a metal plunger 19, is positioned.

The two glass bodies together with the mold and plunger are contained within a heating unit comprising a core 20, surrounded by an electrical heating element 21, and an outer wall 22, composed of insulating refractory material. Said heating unit is provided with a cover 23, having a centrally located hole through which a press ram 24, extends and bears upon the plunger 19.

In Fig. 2 a mold similar to that shown in Fig. 1 contains two glass bodies 25, and 26, having substantially plane contacting surfaces and provided with adherent metal oxide films 27, and 28, shown in exaggerated thickness.

A thin adherent metal oxide film suitable for the present purpose may be formed on the glass preferably by the process known as iridizing, described in my Patent No. 2,118,795. Such process comprises heating the glass to a temperature in the neighborhood of, but sufficiently below, its softening point to avoid distortion and contacting it for a few seconds with a metal compound in fluid form, that is, an atomized solution or the vapor of the metal compound.

Such iridized metal oxide films are substantially transparent and their thickness is uniformly increased by increasing the length of time of exposure of the hot glass to the action of the fluid metal compound. While a thickness of about 1000 angstroms or less, requiring say 1 to 5 seconds exposure, is ample for preventing the adhesion of the glass surfaces according to the invention, greater thicknesses, say up to 10,000 angstroms or more, may also be used if visibility of the film is not objectionable.

Metals which are known to produce iridized metal oxide films by such method include zinc, cadmium, aluminum, indium, thallium, silicon, titanium, germanium, zirconium, tin, lead, thorium, columbium, antimony, and tantalum, all of which produce substantially colorless oxide films, and copper, vanadium, bismuth, chromium, molybdenum, tungsten, manganese, iron, cobalt, and nickel, which produce colored oxide films, that is, films which are substantially transparent only to selected visible wave lengths.

For the production of the thin iridized metal oxide films, any compound of one of the above-recited metals which is or can be in fluid form, that is, the vapor or an atomized solution of the compound, can be used. Inorganic compounds which are suitable are for the most part salts of inorganic acids and include, for example, the chlorides, which are generally the most suitable, as well as iodides, bromides, fluorides, sulfates, nitrates, and the like.

Organic salts and compounds of the recited metals are generally not easily available but such as are available can be used provided they can be dissolved or diluted, if not with water, with a solvent such as an alcohol, toluene, benzene, or other miscible liquid. Such compounds may include open chain compounds such as acetates, lactates, oleates, oxalates, salicylates, stearates, tartrates, and the like, and aromatic compounds such as the benzoates, phenolates, phenolsulfonates, and so forth. Some organic compounds of tin, which are particularly suitable, are dibutyl tin diacetate, dibutyl tin dilaurate, dibutyl tin oxide, dibutyl diphenyl tin, dilauryl tin dichloride, dibutyl tin dichloride, diphenyl tin dichloride, dibutyl tin ethylate, tetraphenyl tin, tetrabutyl tin, dibutyl tin diethylate, and so forth.

To produce such thin iridized metal oxide films, preferably a solution of the metal compound is atomized and sprayed as a fine mist against the heated glass. Substantially the same result is obtained by evaporating the metal compound, if volatile without decomposition, and contacting the surface of the hot glass with the resultant fumes. Upon coming into contact with the hot glass the metal salt or compound is converted to the corresponding metal oxide which adheres with great avidity and in a very thin uniform layer to the surface of the glass.

Suitable adherent metal oxide films or coatings may also be produced by evaporating the metal oxide adjacent the cool glass surface in a vacuum and condensing the vapor on the glass or by evaporating the metal in like manner and thereafter heating the metal coated glass in air or in air enriched with oxygen to convert the metal to its oxide.

It has been found that a thin metal oxide film applied in accordance with any of the methods described above and which adheres tenaciously to the glass will not adhere to a similar oxide film nor to metal under the conditions of heat or of heat and pressure required to conform glass surfaces to each other. Glass surfaces, shaped by the new method, therefore, do not adhere to each other but can be separated after conformation and are as accurately matched as if the metal oxide film had been absent. Separation has been found to be facilitated by placing a drop of liquid such as water or alcohol on the edge of the conformed surfaces.

As an example of one method of carrying out the present invention illustrated in Fig. 1 of the drawing, the glass bodies 10, and 17, are individually heated to a temperature about 50° C. below their respective softening points and a solution comprising 100 grams $SnCl_4.5H_2O$, 10 cc. of concentrated aqueous HCl, and 50 cc. $H_2O$ is atomized against their faces for about 5 seconds. After being cooled the treated glass bodies are placed in the mold bottom 12, and sufficient electric current is passed through the heating element 21, to heat the mold, the plunger 19, and the glass bodies 10, and 17, to about the annealing point of the glass, or the temperature at which the viscosity of the glass is $10^{13}$ poises. The plunger 19, is then brought into contact with the glass body 17, and pressure is slowly applied thereto up to about 10 pounds per square inch until the lower surface of the glass body 17, has acquired the approximate shape of the upwardly turned face of the glass body 10. For conforming the contacting surfaces, more pressure is then brought to bear up to about 150 pounds per square inch for about 5 minutes, after which the electric current is interrupted. When the temperature of the glass is below the strain point, the mold is opened and the glass is removed. If desired, other pressures may be used for conforming the contacting surfaces, for instance, a pressure of 10 pounds per square inch for 3 hours or a pressure of 1500 pounds per square inch for 1 minute or less. Temperatures above the annealing point and practically up to the softening point of the softer glass can also be utilized, wherefore the same conformation without adhesion of the contacting glass surfaces can be completed in a shorter time and/or at a lower pressure, or even without the application of external pressure, relying entirely upon the pressure due to gravity to effect the desired conformation.

By a similar procedure two or more pieces of substantially flat glass of practically any desired area, such as drawn or rolled sheet glass, may at the same time be shaped with or without the application of external pressure and their contacting surfaces conformed, as shown in Fig. 2.

In order to compare the results of conforming metal oxide-coated glass sheets according to this invention with those conformed without having such films applied, four pairs of flat sheets of glass, having a softening point of 715° C. and a strain point of 550° C., were bent by sagging them into a concave cast iron mold having a curvature of 10½ inches radius. Three of the pairs of sheets first had their faces, which were to be in contact with each other and with the mold, coated in the above described manner with iridized metal oxide films. On one pair the film consisted of $SnO_2$ and $Sb_2O_3$ and resulted from spraying the heated glass for one second with a solution containing 97 parts by weight $SnCl_4.5H_2O$ and 3 parts by weight $SbCl_3$; on the second pair the film consisted of $TiO_2$ and resulted from spraying the heated glass for one second with a solution of $TiCl_4$; and on the third pair the film consisted of $ZrO_2$ and resulted from spraying the heated glass for one second with a solution of $ZrCl_4$. In each case the film was transparent and had a thickness of about 500 angstroms or first order white. The fourth pair had no coatings or films of any kind applied to its surfaces.

Each coated pair of glass sheets was in turn placed on the mold with a coated face down and coated faces in contact with each other, the assembly was placed in a cool furnace and the temperature of the furnace was thereafter raised to 685° C. (about 30° C. below the softening point) where it was held for about 12 minutes, after which it was allowed to cool freely. The uncoated pair of glass sheets was similarly heated in the same mold and furnace at the same temperature and for the same length of time.

When subsequently examined each pair of glass sheets was found to have been conformed closely to the contour of the mold and to each other, the cut edges of each sheet retaining their initial sharpness. The coated pairs of glass sheets were transparent, whole and easily separable but the uncoated pair of glass sheets was sealed or welded together and cracked during cooling.

The new method may desirably be utilized for the production of flat or curved sheets having accurately matched surface contours, which are adapted to be joined with an interposed sheet of organic plastic material between said surfaces and subsequently sealed to form laminated safety glass. For purposes requiring invisibility of the metal oxide film in the final product, films which are substantially colorless, and especially films of tin oxide, zirconium oxide, or titanium oxide, are particularly useful in thicknesses of not more than about 1000 angstroms. The colored metal oxide films above referred to are useful for the production of colored sheets or other glass articles conformed in shape to one another in accordance with the invention, such as for example curved sheets for the production of tinted laminated windshields for motor vehicles. If desired, however, the metal oxide film, whether visible or not, may be removed from the glass after it has served its purpose in the shaping of the glass surface. Such removal may be accomplished by dissolving the film with a reducing acid such as hydrochloric acid used in conjunction with powdered zinc.

The term "annealing range" as used herein is, for each glass, the range of temperatures between the strain point and the annealing point of the glass.

This application is a continuation in part of my copending application Serial No. 463,968 filed October 22, 1954 and now abandoned.

What is claimed is:

1. The method of conforming the surfaces of glass bodies to the contours of the surfaces of other bodies in contact therewith while heated without adhering them, which comprises forming on the contacting glass surfaces an adherent metal oxide film, placing the bodies together and shaping the glass surfaces while the bodies are heated sufficiently to permit plastic flow and conformation of the glass.

2. The method of claim 1 in which a glass body is conformed to the contour of another glass body.

3. The method of claim 1 in which a surface of a first glass body is conformed to the surface of a supporting mold while simultaneously a surface of a second glass body is conformed to the other surface of said first glass body.

4. The method of conforming a surface of a glass body with the contour of a surface of a second glass body by contacting said surfaces with pressure while heated but without adhering them, which comprises forming on said contacting surfaces a substantially transparent, iridized metal oxide film, placing said bodies together with their said surfaces in juxtaposition and applying pressure to urge said surfaces into intimate contact while heating said bodies between the strain point and the softening point of the softer glass until said surfaces are conformed to each other and the stresses induced by such pressure have been released, then cooling said bodies and removing the pressure.

5. The method of claim 4 in which the metal oxide film is tin oxide.

6. The method of claim 4 in which the metal oxide film is titanium oxide.

7. The method of claim 4 in which the metal oxide film is colored.

8. The method of conforming the surfaces of glass sheets to each other which comprises forming on the contacting faces of the sheets adherent metal oxide films, bringing said faces together and shaping the sheets to a desired contour while heating them sufficiently to permit plastic flow and conformation of the glass.

9. The method of shaping glass sheets to conform to each other which comprises forming on the contacting faces of the sheets substantially transparent iridized metal oxide films, bringing said faces together and applying pressure to urge said faces into intimate contact while heating said sheets between a temperature within the annealing range and the softening point temperature of the glass to be shaped until said faces are conformed to each other and the stresses induced by such pressure have been released, and then cooling said sheets and removing the pressure.

10. The method of claim 9 in which the metal oxide film is tin oxide.

11. The method of claim 9 in which the metal oxide film is titanium oxide.

12. The method of claim 9 in which the metal oxide film is colored.

13. In the method of conforming simultaneously a plurality of superimposed glass sheets by heating them while in contact with each other and with a mold surface, in combination, the step which consists in forming on all contacting glass surfaces an adherent metal oxide film.

References Cited in the file of this patent

UNITED STATES PATENTS 2,118,795    Littleton _____ May 24, 1938